(12) United States Patent
Barchi et al.

(10) Patent No.: US 7,328,210 B2
(45) Date of Patent: Feb. 5, 2008

(54) ATTRIBUTE RULE ENFORCER FOR A DIRECTORY

(75) Inventors: Ronald Samuel Barchi, Maple Valley, WA (US); Jeffrey P. Carter, North Dighton, MA (US)

(73) Assignee: AT&T Mobility II LLC, Atlanta, GA (US)

( * ) Notice: Subject to any disclaimer, the term of this patent is extended or adjusted under 35 U.S.C. 154(b) by 1047 days.

(21) Appl. No.: 09/921,015

(22) Filed: Aug. 1, 2001

(65) Prior Publication Data

US 2003/0074372 A1    Apr. 17, 2003

(51) Int. Cl.
*G06F 17/30*    (2006.01)

(52) U.S. Cl. .................. 707/6; 707/1; 707/2; 707/3; 707/8; 707/10

(58) Field of Classification Search ............... 707/3, 707/4, 9, 100, 102, 103 R, 201, 10, 1, 2, 707/8; 379/67.1, 218.01; 709/217, 229; 713/155

See application file for complete search history.

(56) References Cited

U.S. PATENT DOCUMENTS

5,983,234 A    11/1999    Tietjen et al. ........... 707/103 R
6,098,099 A    8/2000    Ellesson et al. ............ 709/223
6,101,539 A    8/2000    Kennelly et al. ........... 709/223
6,101,541 A    8/2000    Ellesson et al. ............ 709/225
6,119,122 A    9/2000    Bunnell ...................... 707/102
6,122,258 A    9/2000    Brown ........................ 370/256
6,131,120 A    10/2000    Reid .......................... 709/225
6,377,950 B1    4/2002    Peters et al. ................. 707/10

*Primary Examiner*—Jeffrey Gaffin
*Assistant Examiner*—Farhan M. Syed
(74) *Attorney, Agent, or Firm*—Powell Goldstein LLP (57)    ABSTRACT

An attribute rule enforcer for evaluating the attributes of a call to add, modify, or delete information in a directory, such as a lightweight directory access protocol (LDAP) directory. The attribute rule enforcer determines if the attributes of the call comply with predetermined rules governing the directory's content. The directory attribute rule enforcer may be located at the front end of the directory's access server, and intercepts calls to the directory access server. If the directory attribute rule enforcer determines that the attributes of a call complies with the rules governing the content of the directory, it will forward the call to the directory's access server for action. If, on the other hand, directory attribute rule enforcer determines that the attributes of a call do not comply with the rules governing the content of the directory, the attribute rule enforcer will reject the call. Further, it may forward an appropriate error message to the source of the call.

5 Claims, 5 Drawing Sheets

ATTRIBUTE RULE ENFORCER FOR A DIRECTORY

FIELD OF THE INVENTION

The invention relates to a method and system for reviewing the attributes of a request or "call" to modify, add or delete data stored in a directory, such as a lightweight directory access protocol (LDAP) directory, to determine if the call's attributes comply with predetermined rules for controlling the contents of the directory. If the attributes do not comply with the predetermined rules, then the call is denied and an error message may be returned to the source of the call.

BACKGROUND OF THE INVENTION

A directory is an index of entry names (i.e., "relative distinguished names") and information associated with each entry name. Directories can be used for a variety of purposes, from providing telephone number and address information (i.e., a telephone directory) to maintaining service plan information for wireless telephone service subscribers. One particular use of an electronic directory is to correlate user information with electronic mail services for an electronic mail service center. In this arrangement, the electronic mail service directory includes an index of names for each user of the electronic mail services. The directory then associates each user name with particular information related to that user, such as the specific electronic mail services available to the user. One type of electronic directory is the X.500 directory, which employs the protocols recommended by the International Telecommunication Standardization Sector (ITU-T) for client/server systems that maintain and access directories of user and resources in X.400 form.

An electronic mail service center or hub may service a number of different users (or subscribers) with various electronic mail-capable devices under one domain. Accordingly, some of the electronic mail users may need a robust mail server that allow a user to designate "email aliases" for message delivery. To successfully employ these aliases, the electronic mail service directory will typically maintain a separate directory entry for each user. The electronic mail service directory may also require some post processing of information added to the directory, in order to completely populate a directory entry.

Due to the inherent flexibility of a directory, the content of the entries in a directory can vary greatly. An electronic mail service provider, however, may require consistency in both the structure and content of these entries. Of course, users of other types of directories may also require consistent structure and content in their directory entries. Accordingly, there is a need for a service that maintains consistent content in a directory. More particularly, there is a need for a service that rejects attempts to add information to, modify information in or delete information from a directory that violate predetermined rules for controlling the directory's content.

A variety of protocols have been developed for finding, adding, deleting and modifying information in a directory. For example, the Lightweight Directory Access Protocol (LDAP) is a protocol developed to manipulate transmission control protocol/Internet protocol (TCP/IP) stacks to extract information from (or add information to) a hierarchical directory such as a X.500 type directory. These protocols, however, do not give the directory provider (i.e., the entity that maintains the directory) the ability to control the consistency of content added to, modified in or deleted from a directory. Instead, a directory provider must typically employ some type of back-end proprietary database scheme to enforce the consistency of content in a directory. This arrangement has a number of drawbacks. For example, a user seeking to add prohibited information to a directory will not usually be informed that the information is prohibited. Instead, the information is simply refused entry into the directory, and the user is unaware that the submitted information has been rejected.

BRIEF SUMMARY OF THE INVENTION

Advantageously, the invention provides a method and system for reviewing the attributes of a call to add, modify, or delete information in a directory, to determine if the attributes of the call comply with predetermined rules. According to one embodiment of the invention, a directory attribute rule enforcer is located at the front end of directory access server, such as a LDAP server computer, that is providing access to a directory. The directory attribute rule enforcer intercepts calls to the directory access server, and then analyzes the attributes of those calls. The directory attribute rule enforcer will take action on those calls based upon whether the analyzed attributes comply with one or more previously defined rules.

For example, an intercepted call may be a request to add a number to a field in the directory designated for storing telephone numbers. Accordingly, the call's attribute value may be a ten-digit number. If the first three digits of the call's attribute value do not match an area code on a previously specified list of area codes, then the directory attribute rule enforcer will reject the call and return an error message to the source of the call. Advantageously, the error message may inform the source of the reason why the call was rejected, thereby allowing that source to submit another call with corrected attribute values. On the other hand, if the directory attribute rule enforcer determines that the first three digits of the call's attribute value match an area code on the list, then the directory attribute rule enforcer will forward the call onto the directory access server for adding the telephone number into the directory.

DETAILED DESCRIPTION OF THE INVENTION

As is well known in the art, electronic directories and electronic directory access protocol servers for accessing electronic directories are conventionally maintained on programmable computer systems. Similarly, a directory attribute rule enforcer according to the invention may be implemented by a programmable computer system.

Figure 1:
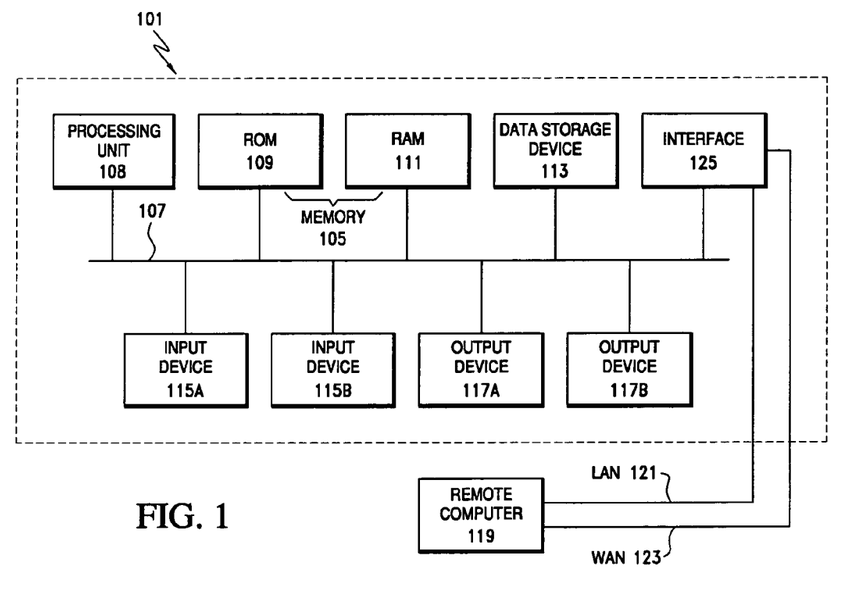
FIG. 1 shows one example of a conventional computer system by which various components of a directory network system according to an embodiment of the invention may be implemented.

FIG. 1 shows one such exemplary programmable computer system 101. As seen in this figure, the computer system 101 includes a processing unit 103, which may be, e.g., a programmable microprocessor or other device for processing electronic instructions. The processing unit 103 is connected a system memory 105, and a system bus 107 that couples various system components, including the system memory 105, to the processing unit 103. The system memory 105 may include a read-only memory (ROM) 109 and a random access memory (RAM) 111.

The software routines that help to transfer information between the various components of the computer system 101, such as during startup, may be stored in the read-only memory (ROM) 109. If the computer system 101 is a personal computer, it may further include one or more data storage devices 113. Each data storage device 113 may include, for example, a magnetic disk drive for storing information to and retrieving information from a fixed or removable magnetic disk an optical disk drive for storing information to and retrieving information from a fixed or removable optical disk, a removable memory card, or any other suitable type of memory storage media.

A number of program modules may be stored in the system memory 105, in one or more of the data storage devices 113, or in any combination thereof. A user may then enter information into the computer system 101 through one or more input devices 115, such as a keyboard, a pointing device, a touch screen, a microphone, a joystick or any other suitable interface device. The computer system 101 may also employ one or more of a variety of different output devices 117, such as a monitor, speakers, a printer, or other type of display device, to convey information from the computer system 101 to the user.

In order to receive directory calls from a variety of sources, a programmable computer system 101 embodying a directory attribute rule enforcer, an electronic directory, or a directory access protocol server preferably is capable of operating in a networked environment using logical connections to one or more remote computers, such as the remote computer 119. The computer system 101 may be connectable to the remote computer 119 through a local area network (LAN) 121 or a wide area network (WAN) 123, such as the Internet. When used in a networking environment, the computer system 101 may be connected to such a network through an interface 125, such as a wireless transceiver, a modem, an Ethernet connection, or any other such interface. While the interface 125 is illustrated as an internal interface in FIG. 1, it may alternately be an external interface as is well known in the art. Of course, it will be appreciated that the network connections shown in this figure are exemplary, and other means of establishing a communications link with other computers to access an electronic mail account may be used.

Figure 2:
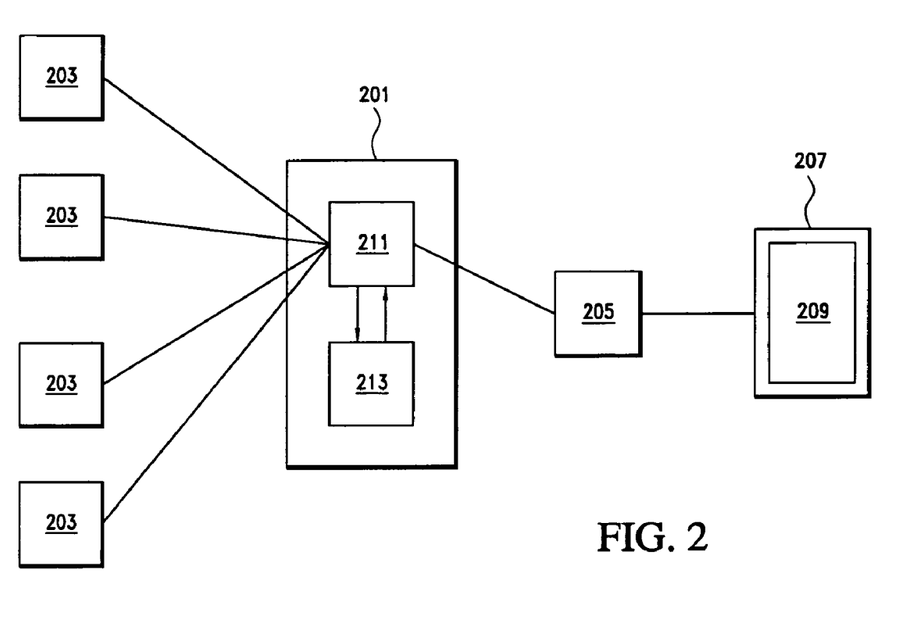
FIG. 2 shows a directory network system employing a directory attribute rule enforcer according to an embodiment of the invention.

FIG. 2 illustrates one embodiment of a directory network 200 according to the invention. As seen in this figure, in the directory network 200, a directory attribute rule enforcer 201 is interposed between a plurality of client computers 203 and a directory access server 205. As is known in the art, the directory access server 205 "serves" the client computers 203 by providing access to a directory server 207, which maintains an electronic directory 209. More particularly, as is known in the art, the client computers 203 submit "calls" to the directory access server 205. The directory access server 205 then takes some action in response to those calls according to the protocol employed by the directory access server 205.

Generally, a call to a directory 209 will typically include at least two components: an operation and one or more attributes to be employed in the operation. More particularly, the operation defines the action to be taken by the directory access server 205. For example, the operation may be a request to retrieve information previously stored in the directory. Alternately, the operation may be a request to add information to the directory, or it may be a request to delete information already stored in the directory. Still further, a call may be a request to modify information stored in the directory. Thus, when the directory access server 205 receives a call from a client computer 203, the directory access server 205 then retrieves, adds, modifies, or deletes information in the directory 209 based upon the operation requested in the call.

The attributes of a call, on the other hand, specify the arguments of the operation requested in the call. Thus, a call will typically include at least one attribute identifying the field in the directory upon which the operation will be performed. A call may also include a value for that attribute. (It should be noted that, e.g., a call to retrieve data from a directory would not necessarily include an attribute value, but could instead identify only the field from which an existing value is to be retrieved). For example, if the directory 209 is a directory of addresses and telephone numbers, each entry in the directory 209 may have a telephone number field, a street address field, a city field, a state field and a zip code field. In a call to add a telephone number to the directory 209, the operation of the call would be the "add" operation, the attribute of the call would be the telephone number field, and the value of the attribute would be a ten digit number specifying the telephone number to be stored in the telephone number field. Similarly, in a call to modify a city name already stored in the directory 209, the operation of the call would be the "modify" operation, the attribute of the call would be the city field, and the value of the attribute would be the string of alphabetical characters to be used to modify the existing string of characters stored in the city field.

Various embodiments of the directory attribute rule enforcer 201 according to the invention can be used to ensure that calls to add, modify or delete information from the directory 209 contain only attributes complying with a hierarchy of rules designated by the directory provider. Thus, with the above example, the directory attribute rule enforcer 201 according to the invention could be used to ensure that an attribute value in a call to add a telephone number to the directory 209 includes only numbers, and does not include letters. Further, the directory attribute rule enforcer 201 could be used to ensure that an attribute value in a call to add a telephone number to the directory 209 includes only a ten-digit number (i.e., a three digit area code number coupled with a seven digit local number). Still further, the directory attribute rule enforcer 201 could be used to ensure that an attribute value in a call to add a telephone number to the directory 209 includes only a ten-digit number containing a preselected area code.

As will be appreciated by those of ordinary skill in the art, the directory access server 205 may be, for example, a lightweight directory access protocol (LDAP) server that saves information to and retrieves information from the directory 209 according to the lightweight directory access protocol (LDAP). As will also be appreciated by those of ordinary skill in the art, the directory access server 205 and the directory server 207 may be embodied on two or more different computer systems 101. Alternately, both the access server 205 and the directory server 207 may be embodied on a single computer system 101.

According to the invention as illustrated in FIG. 2, each call from a client computer 203 is first transmitted to the directory attribute rule enforcer 201. The directory attribute rule enforcer 201 includes a transaction monitor 211 and a rule validator 213. Together, the transaction monitor 211 and the rule validator 213 validate individual calls to the directory 209. That is, the transaction monitor 211 and the rule validator 213 cooperate to ensure that the attributes of each call seeking to add, modify or delete information from the directory 209 comply with attribute rules determined by the directory provider. The transaction monitor 211 and the rule validator 213 may be, e.g., implemented by software, hardware, or a combination of the two. For example, in the embodiments described below, the transaction monitor 211 and the rule validator 213 may be implemented by software written in the C++ programming language operating in a UNIX-based operating environment, such as the Solaris™ operating system. As will be appreciated by those of ordinary skill in the art, if the transaction monitor 211 and/or the rule validator 213 are implemented using software, the software may be stored on a data storage medium such as that which may be employed by a storage device 113 as discussed above.

If the attributes of a call comply with the rules specified by the directory provider, then the directory attribute rule enforcer 201 forwards the call to the directory access server 205 for action. If, however, the attributes of a call do not comply with the rules specified by the directory provider, then the directory attribute rule enforcer 201 does not relay the call to the directory access server 205. The directory attribute rule enforcer 201 may instead return an error message to the client computer 203 that submitted the call. The error message may, for example, simply indicate that the call does not comply with the rules governing the directory 209. Alternately, the error message may explain in detail why the call does not comply with the rules governing the directory 209. The operation of the directory attribute rule enforcer 201 will be described in more detail with reference to FIG. 3.

Figure 3A:
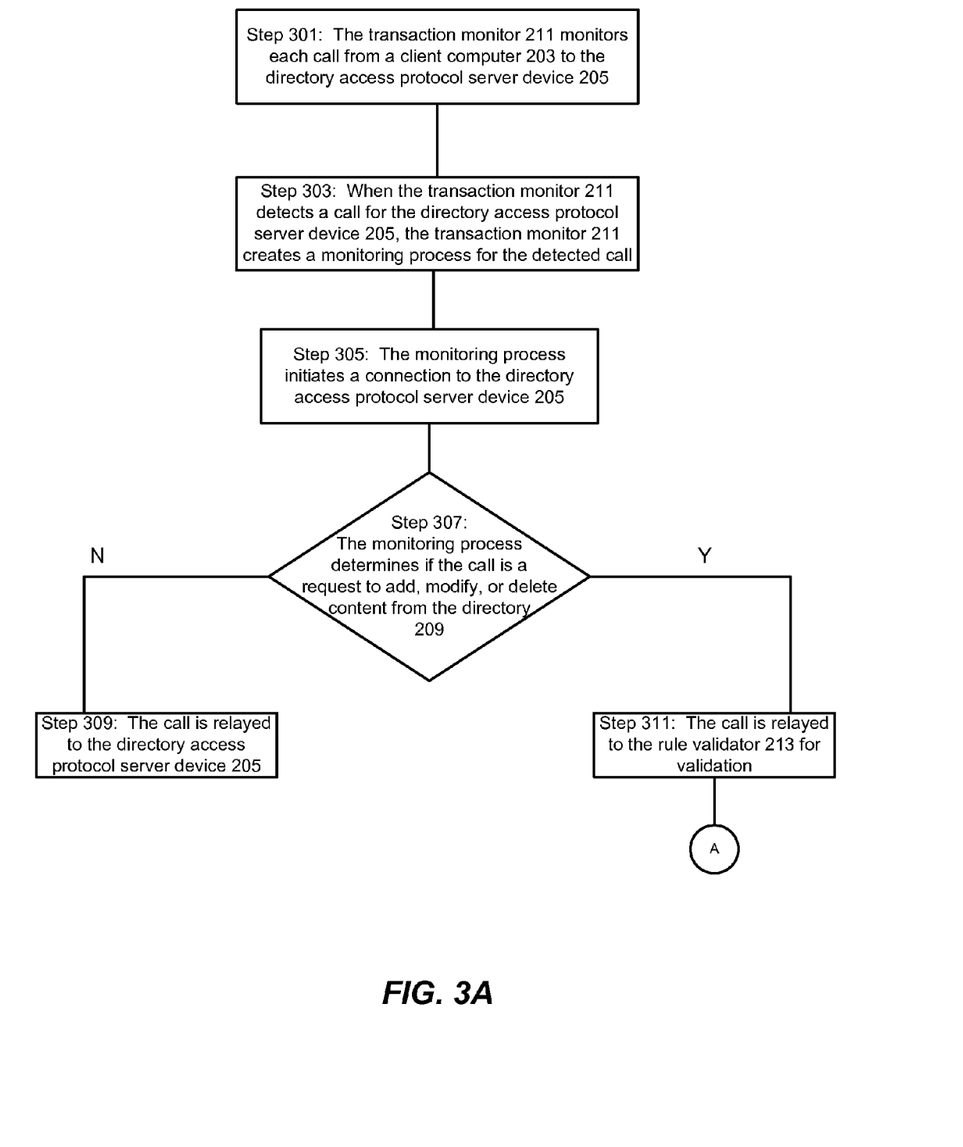
FIGS. 3A-3C illustrate a method of operation for a directory attribute rule enforcer according to an embodiment of the invention.

First, in step 301, the transaction monitor 211 monitors each call from a client computer 203 to the directory access server 205. For example, if the transaction monitor 211 is implemented within a UNIX-based operating environment as discussed above, the operation of the transaction monitor 211 may be invoked via the "inetd" operation. As is known in the art, the "inetd" operation is a UNIX system process that can be configured to listen on a specified port number via a specified protocol, and to then invoke a program each time an event is posted to the port on which the "inetd" operation is listening. With electronic directory networks, port number 389 conventionally is used as the port number for the directory access server 205. Thus, with this conventional port configuration, the "inetd" operation may be employed by the invention to listen on port number 389 for, e.g., transmission control protocol (TCP) connection requests.

When the "inetd" operation of the transaction monitor 211 detects a call (e.g., a TCP connection request) on this port that is intended for the directory access server 205 in step 301, the transaction monitor 211 creates a monitoring process for the call in step 303. Next, the monitoring process initiates a connection to the directory access server 205 in step 305, in order to relay the call to the directory access server 205 if the call is determined to comply with the attribute rules for the directory. The monitoring process then monitors communications from the client computers 203 directed and intended for the directory access server 205.

It should be noted that, for some embodiments of the invention, the transaction monitor 211 preferably creates a monitoring process for each call to the directory access server 205. Thus, with the above-described embodiments of the invention employing a UNIX-based operating environment, for each received connection request, the "inetd" operation will accept the connection, fork, and execute a monitoring process by passing the monitoring process both a user-specified command-line string and the socket on which the connection request was received.

With these embodiments, the command line format to initiate a monitoring process may be, e.g., "tmon <ldap_host> <ldap_port> <ruled_host> <ruled_port>, where "tmon" is the name of the monitoring process, "ldap_host" is the name of the directory access server 205, "ldap_port" is the port address for the directory access server 205, "ruled_host" is the name of the server hosting the rule validator 213, and "ruled_port" is the port address for the rule validator 213. This command line configuration advantageously allows the directory access server 205 and the rule validator 213 to be implemented on different programmable computers, and to vary the ports employed by the directory access server 205 and the rule validator 213, if desired, by changing only the transaction monitor command line arguments specified in the configuration file for the "inetd" operation.

As each call or request to the directory 209 is transferred through from the client computer 203 to the directory access server 205, the monitoring process examines the call in step 307 to determine what directory operation the call is requesting. If the call includes a request to retrieve information from the directory 209, then the transaction monitor 211 relays the call to the directory access server 205 in step 309. If, however, the call is a request to add, modify, or delete content from the directory 209, then the transaction monitor 211 reroutes the call to the rule validator 213 for validation in step 311.

As previously mentioned, the rule validator 213 validates the attributes of calls or requests to the directory access server 205. With some preferred embodiments of the invention, the rule validator 213 is started when the directory network 200 is started. When the rule validator 213 begins operation, it first parses one or more configuration files for the rule validator 213 in step 313, to determine the rule set governing content for the directory 209. With some embodiments of the invention, a single configuration file for the rule validator 213 may contain all of the directory rules that will be enforced by the rule validator 213. Alternately, the configuration file may refer to multiple rule files, each containing a rule set to be enforced by the rule validator 213, or the rule validator 213 may parse multiple configuration files, each containing a rule set to be enforced by the rule validator 213. Also, for some embodiments of the invention where the rule validator 213 is implemented using software in a UNIX-based operating environment, upon startup the rule validator 213 will open a datagram socket and bind to a specific port to service client requests.

A configuration file may contain a variety of parameters for use by the rule validator 213. For example, with some of the embodiments of the invention operating in a UNIX-based operating environment as described above, a configuration file may include an add rules parameter, a modify rules parameter, a modrdn parameter, and a delete rules parameter. A configuration file may also contain a log directory parameter, a service port parameter, a debug level parameter and a directory access protocol error parameter.

With these embodiments, the add rules parameter specifies a file that contains the rule set that the rule validator 213 will use to validate a request to add information to an entry in the directory 209. The default value for this parameter may be, e.g., "./add_rules.cf". If no file is found at the location specified by this parameter, no rules will be in place for requests of this type and the rule validator 213 will simply pass through requests of this type. Similarly, the modify rules parameter specifies a file that contains the rule set for validating the attributes of calls to modify information in an entry of the directory 209. The default value for this parameter may be, e.g., "./modify_rules.cf". If the rule validator 213 does not find a file at the specified location, no rules will be in place for the requests to modify a directory entry and the rule validator 213 will simply pass through calls of this type.

The modrdn rules parameter specifies a file that contains the rule set used by the rule validator 213 to validate calls making a request to modify the name of an entry in the directory 209 (i.e., a call with a "modrdn" request to modify a "relative distinguished name (RDN) in the directory 209). The default value for this parameter may be, e.g., "./modrdn_rules.cf". If the rule validator 213 does not find a file at the location specified, no rules will be in place for calls containing a modrdn request, and the rule validator 213 will simply pass-through requests of this type. Still further, the delete rules parameter specifies a file containing the set of rules to be used by the rule validator 213 to validate requests to delete information from an entry in the directory 209. The default value for this parameter may be, e.g., "./delete_rules.cf". If the rule validator 213 does not find a file at the specified location, no rules will be in place for delete requests, and the rule validator 213 will simply pass through requests of this type without action.

The log directory parameter designates the location of a log file for the operation of the rule validator 213. With some embodiments of the invention, the value for this parameter should preferably be an absolute pathname. The location default for the log file may be, e.g., "/var/tmp" and the log file naming convention may be "ruled_<pid>.log", where <pid> is the process identification for the rule validator 213. With some embodiments of the invention, if the log file reaches 1 MB in size, it is archived to "ruled_<pid>_N.log", where N is a sequential integer starting at 1. With these embodiments, however, the currently enabled log file is preferably always "ruled_<pid>.log". Also, with these embodiments, there may be no command-line switch to override this setting.

The debug level sets the amount of debug information that is written to the log file. Valid settings are in the range from 0-5 inclusive. As will be appreciated by those of ordinary skill in the art, a debug level of 0 will generate no log information and, hence, will not create a log file. A debug level of 5 will generate the maximum amount of debug information including hex packet traces of all incoming and outgoing traffic. The default value of this parameter may be, e.g., 1, and with various embodiments of the invention can be overridden using the −d command-line switch.

The service port parameter specifies the port on which the rule validator 213 will listen for a communication from a monitoring process established by the transaction monitor 211. The default value of this parameter may be, e.g., 13890. Also, with some embodiments of the invention, the −p command-line switch can be used to override this setting when desired. The directory access protocol error parameter may then specify a file containing customized error messages to be sent to a client computer 203 in the case of an error during processing of a call from the client computer 203, e.g., if the call from the client computer 203 is found to have validated one of the rules prescribed by the directory provider. The default value of this parameter may be, e.g., "./ldap_errors.cf". If the rule validator 213 does not find a file at the location specified, an error response will be sent to the client computer 203 in the event of a call processing error, but no text messages may accompany the error response. As will be discussed in detail below, error messages may alternately or additionally be included within the rules specified in the rules parameter files noted above.

Each rule will contain one or more primitives, such that the values assigned to these primitives within a rule will control the operation of the rule validator 213 when enforcing the rule. For example, with some embodiments of the invention, each rule includes a "precedence" primitive. The value of this "precedence" primitive will then be an integer specifying the order in which the rule will be evaluated by the rule validator 213 with respect to other rules. This advantageously allows enforcement of the rules to provide a logical AND functionality. For example, one rule may be designated rule 0, while another rule may be designated rule 1. With this arrangement, the rule validator 213 will evaluate a call's attributes with respect to rule 0 before evaluating a call's attributes with respect to rule 1. Therefore, if the test of the call with respect to rule 1 is successful (i.e., the call's attributes comply with the requirements set forth in that rule), then the call fulfills the requirements of rule 0 AND rule 1.

With some embodiments of the invention, each rule may also include a "dependencies" primitive that allows a rule to specify co-dependencies between it and other rules. With these embodiments of the invention, this arrangement advantageously allows the rules to provide a logical OR functionality, as will be explained in detail below. For example, if rule 0 is specified to be co-dependent on rule 4, then rules 0 and 4 will be validated in succession when rule 0 would normally have been validated. Thus, if either of rule 0 or rule 4 is satisfied, the validation process will pass the call and proceed to validate the call according to the next rule in sequence, rule 1.

A rule will also typically include an "attribute" primitive, specifying the attribute (e.g., with a rule enforcer 201 for a LDAP directory, the LDAP attribute name) upon which the rule will be applied. For example, in one rule, the "attribute" primitive may be assigned a value indicating that the rule is to be applied only to attributes being used to modify information in, add information to or delete information from an entry name field (i.e., a relative distinguished name field). In another rule, the "attribute" primitive may be assigned a value indicating that the rule is to be applied only to attributes in calls to add, modify, or delete information from a telephone number field in the directory 209. In yet another rule, the "attribute" primitive may be assigned a value indicating that the rule is to be applied only to attributes in calls to add, modify, or delete information from an electronic mail address field in the directory 209. Of course, those of ordinary skill in the art will appreciate that the different values that may be assigned to the "attribute" primitive will vary depending upon the data field types contained in the associated directory 209.

Still further, a rule may include a "type" primitive designating the operation to be taken by the rule. For example, with some embodiments of the invention, the "type" primitive in a rule may be assigned the value "compare." When the "type" primitive has this "compare" value, the rule validator 213 will evaluate a call by comparing the value of one attribute designated in the rule with the value of another attribute designated in the rule. Alternately, the "type" primitive may be assigned the value "validate." When the "type" primitive has this "validate" value, the rule validator 213 will determine if the attribute (or attributes) designated in the rule complies with characteristics for that attribute (e.g., the alphanumeric type of the attribute's value, the attribute's value range, the maximum length of the attribute's value, etc.) also designated in the rule.

Thus, a rule containing the primitive "type" having the value "validate" may also contain another primitive specifying how a call's attribute must comply with the require characteristics for that attribute. For example, the rule may contain a second primitive "checktype" requiring that the value of the attribute to be validated be of a particular alphanumeric type. If the value of the primitive "checktype" is "TYPE_ALPHA," then the rule validator 213 will check to confirm that the value of the attribute being validated be made up of only alphabetical characters. If, on the other hand, the value of the primitive "checktype" is "TYPE_DIGIT," the rule validator 213 will check to confirm that the value of the attribute being validated be made up of only numbers (and no letters). A list of eleven particular data types that are available as values of the primitive "checktype," according to one possible embodiment of the invention, is provided below:

1. TYPE_ALPHA—This type requires each element of an attribute's value to be an alphabetical character.
2. TYPE_DIGIT—This type requires each element of an attribute's value to be a number.
3. TYPE_ALNUM—This type requires each element of an attribute's value to be an alphabetical character OR a digit, without punctuation (i.e., spaces, dashes, etc.).
4. TYPE_STRING—This type requires each element of an attribute's value to be an alphabetical character OR a digit, with punctuation and spaces. In addition, this type designates that control characters and escape sequences are screened out (i.e., not considered in testing if the attribute complies with the rule).
5. TYPE_UPPER—This type requires each element of an attribute's value to be an upper-case letter.
6. TYPE_LOWER—This type requires each element of an attribute's value to be a lower-case letter.
7. TYPE_ALNUM_UPPER—This type requires each element of an attribute's value to be a digit OR an upper-case letter only.
8. TYPE_ALNUM_LOWER—This type requires each element of an attribute's value to be a digit OR a lower-case letter only.
9. TYPE_CONTAINS—This type requires an attribute's value to contain the string specified in the rule.
10. TYPE_REGEX—This type requires an attribute's value to match a regular expression supplied by the rule.
11. TYPE_ANY—This type bypasses type validation where the rule is only to check the length of an attribute' value.

Still further, a rule may include a primitive "minlen" specifying the minimum length of elements (e.g., characters or numbers) in an attribute's value. With some embodiments of the invention, a particular value for this primitive, such as, e.g., −1, can be used indicate that this minimum length should not to be checked by the rule validator 213. Similarly, a rule may also include a primitive "maxlen" specifying the maximum length of an attribute's value. Again, with some embodiments of the invention, a particular value for this primitive, such as, e.g., −1, can be used indicate that this maximum length should not to be checked by the rule validator 213. As will be appreciated by those of ordinary skill in the art, the use of such "null" primitive values in the rule allows a user to control the operation of a primitive within a rule without having to add and delete the primitive itself from the rule.

As previously noted, with some embodiments of the invention, when a call does not comply with the rules designated by the directory provider, the directory attribute rule enforcer 201 preferably returns an error message to the source of the call. Thus, a rule may include a primitive "errmsg." The value of this primitive may be a character string corresponding to the rule. For example, if a rule requires that all of the elements of an attribute's value be letters, then the rule may also contain the primitive "errmsg" having the value of the character string "Each element of the value of the submitted attribute must be a letter." Thus, if the rule validator 213 determines that the attribute of a call violates the rule, the directory attribute rule enforcer 201 will send the character string "Each element of the value of the submitted attribute must be a letter." to the client computer 203 originating the call. This will allow the user submitting the call to correct the noted error in the attribute and resubmit the call with the corrected attribute.

Alternately, the value of the primitive "errmsg" may instead refer to an error message stored in another location. As noted above, the configuration file for the rule validator 213 may identify a file (e.g., the directory access protocol error parameter file) containing error messages to be used by the rule validator 213. Thus, the primitive "errmsg" (or an alternate primitive in the rule) may refer the rule validator 213 to an error message stored in a separate location. The rule validator 213 can then retrieve the referenced error message for delivery to the client computer 203 originating the failed call. This reference to an error message stored in a different location from the rule conveniently allows a user to edit an error message without having to edit the rule itself.

A detailed list of primitives and their range of possible values according to one embodiment of the invention is provided in Table 1. This table also indicates when each primitive may be included in a rule. As indicated in the table, a primitive may be required, required to be included in a rule in conjunction with another primitive, or optional. In addition, the table explains the use of each listed primitive. Of course, those of ordinary skill in the art will appreciate that this table includes only one possible combination of primitives and their corresponding primitive values and requirements. Any combination of rule primitives, primitive values and requirements may be employed as desired to enforce data consistency in the directory 209.

TABLE 1

| Primitive | Allowed Values | Requirements | Description |
| --- | --- | --- | --- |
| PRECEDENCE | Positive Integers | REQUIRED | This primitive specifies the order in which the rule will be validated. |

TABLE 1-continued

| Primitive | Allowed Values | Requirements | Description |
| --- | --- | --- | --- |
| TYPE | COMPARE VALIDATE | REQUIRED | This primitive specifies whether the rule will validate the data type of an attribute's value or compare the value of one attribute to the value of another attribute. |
| QUALIFIER | EQ NEQ SUBSTRING | Required for TYPE=COMPARE; ignored otherwise | This primitive denotes, for rules of type COMPARE, whether the check of the designated attributes' values will be for equality, inequality, or substring match. |
| MATCHTYPE | BEGIN END OFFSET CONTAINS BEFORE AFTER | Required for QUALIFIER=SUBSTRING STRING; ignored otherwise. | This primitive specifies the type of substring search to perform if the rule primitive QUALIFIER has the value SUBSTRING. BEGIN requires the substring to be at the beginning of the string, END at the end, OFFSET at the specified offset, and CONTAINS requires only that one be contained in the other. The BEFORE and AFTER values specify a delimited search. After the BEFORE or AFTER tag, a quoted delimiter is specified. The value must be equal to the string before or after the delimiter in its entirety. Default if MATCHTYPE is not specified will be CONTAINS. |
| ATTRIBUTE | LDAP attribute name | REQUIRED | This primitive denotes the LDAP attribute against which the required checks will be done. |
| ATTRIBUTE | LDAP attribute name | Required for TYPE=COMPARE; ignored otherwise. | This primitive denotes, for rules including the primitive COMPARE, the other LDAP attribute against which the previously specified attribute will be checked. |
| CHECKTYPE | A defined data type as specified in the Ruled Design Document. | Required for TYPE=VALIDATE; optional otherwise. | This primitive denotes the required data type of the LDAP attribute being checked. |
| MINLEN | Positive Integers and zero. | Optional | This primitive denotes the minimum allowable length of the LDAP attribute being checked. |
| MAXLEN | Positive Integers and zero. | Optional | This primitive denotes the maximum allowable length of the LDAP attribute being checked. |
| COMPARETO | Quoted string | Required for CHECKTYPE=REGEX and CHECKTYPE=COMPARE; ignored otherwise. | The value of this primitive is the string or regular expression against which the LDAP attribute specified should be checked. |
| ERRMSG | Quoted string | Optional | The value of this primitive is the rule-specific error message delivered to the client if validation fails. |
| DEPENDENCIES | Comma-separated list of integers. | Optional | This primitive specifies the precedences of other rules which are to be logically OR'ed with the rule having this primitive during the validation process. |

TABLE 1-continued

| Primitive | Allowed Values | Requirements | Description |
|---|---|---|---|
| IFPASS | GOTO PASS FAIL | Optional | This primitive can specify special semantics in rule flow. If the data passes the current test, processing can GOTO a specified rule precedence, PASS validation, or FAIL validation. If not specified, rule processing continues in numeric order. |
| IFFAIL | GOTO PASS FAIL | Optional | This primitive can specify special semantics in rule flow. If the data fails the current test, processing can GOTO a specified rule precedence, PASS validation, or FAIL validation. If not specified, rule processing continues in numeric order. |

According to some embodiments of the invention, each rule may be specified in the following format. First, the definition of each rule may begin with the word "RULE" followed by a curly bracket "{", to signify the beginning of the rule. On the following line, the rule will be delineated using all required primitives as well as any desired optional primitive. Each primitive is followed by a colon, and then by the value designated for the primitive. The rule primitive then terminates with a closing curly bracket "]".

One example of such a rule, instructing the rule validator 213 to make a compare operation without using type checking, is shown below:

```
RULE {
    PRECEDENCE: 0
    TYPE: COMPARE
    QUALIFIER: EQ
    ATTRIBUTE: cn
    ATTRIBUTE: alias
    ERRMSG: "The value of the cn and alias attributes must be
    identical."
}
```

More particularly, this rule instructs the rule validator 213 to compare the value of the attribute "cn" provided in a call to the directory 209 with the value of the attribute "alias" in that call. If the two values are equal, then the call passes the rule. On the other hand, if the rule validator 213 determines that the value of the attribute "cn" is not equal to the value of the attribute "alias," then the call fails the rule and the attribute rule enforcer 201 transmits the error message "The value of the cn and alias attributes must be identical." to the client computer that initiated the call.

Another example of a rule, instructing the rule validator 213 to make a compare operation using type and length checking, is shown below. It should be noted that, because the precedence of the following rule is "1" while the precedence of the previous rule is "0," the rule validator 213 would test the attributes of a call using the previous rule before using the rule that follows.

```
RULE {
    PRECEDENCE: 1
    TYPE: COMPARE
    QUALIFIER: NEQ
    ATTRIBUTE: cn
    ATTRIBUTE: alias
    CHECKTYPE: TYPE_DIGIT
    MINLEN: 10
    MAXLEN: 10
    IFPASS: GOTO 10
    IFFAIL: FAIL
    ERRMSG: "The value of the cn and alias attributes must not be
    identical."
}
```

Thus, this rule instructs the rule validator 213 to compare the value of the attribute "cn" of a call with the value of the attribute "alias" of the call, to confirm that they are not equal. If the two values are equal, or if the value of the attribute "cn" is a subset of the value of the attribute "alias," then the call fails the rule. The rule also instructs the rule validator 213 to confirm that all of the elements in the value of the attribute "cn" be numbers. If any of the elements in the value of the attribute "cn" are not numbers, then the call will fail the rule. Still further, the rule instructs the rule validator 213 to confirm that the value of the attribute "cn" has no more than ten elements, and also has no less than ten elements. Additionally, if the rule validator 213 determines that a call has passed the rule, the rule instructs the rule validator 213 to next test the call according to the rule identified by precedence number ten. If, on the other hand, the rule validator 213 determines that a call has failed the rule, the rule instructs the rule validator 213 to fail the rule and issue the error message "The value of the cn and alias attributes must not be identical."

Still another example of a rule that validates the value of an attribute using type and length checking is provided below.

```
RULE {
    PRECEDENCE: 2
    TYPE: VALIDATE
    ATTRIBUTE: cn
```

```
CHECKTYPE: TYPE_DIGIT
MINLEN: 10
MAXLEN: 10
ERRMSG: "The value of the cn attribute must be of length 10 and
be numeric.
DEPENDENCIES: 3
}
```

This rule instructs the rule validator 213 to check the value of the attribute "cn" of a call to confirm that its value has no more than ten elements, and also has no less than ten elements. Because this rule contains the primitive "dependencies," the rule validator 213 will also check the call's attributes against the rule specified by the value of the primitive "dependencies." Thus, with this example, after checking to see if the call's attributes comply with the rule above, the rule validator 213 will also determine if the call's attributes comply with the rule having the primitive "precedence" with a value of three. This rule, listed immediately below, instructs the rule validator 213 to check whether the value of the attribute "cn" in the call includes the character string "pocketnet."

```
RULE {
    PRECEDENCE: 3
    TYPE: VALIDATE
    ATTRIBUTE: cn
    CHECKTYPE: TYPE_CONTAINS
    COMPARETO: "pocketnet"
    ERRMSG: "The value of the cn, if not numeric, must contain
    'pocketnet'."
    DEPENDENCIES: 2
}
```

According to the embodiments of the invention that employ the primitive "dependencies" to perform a logical OR operation with different rules, if the call's attributes pass either rule two or rule three, the rule validator 213 will pass the call. If, however, the call's attributes fail both rules, then the rule validator 213 will fail the call. Of course, while the "dependencies" primitives in the example rules provided above have only a single value, the "dependencies" primitive for a rule may have multiple values, allowing the requirements of more than two rules to be logically OR'ed together. Also, in the example rules above, the error message is contained within each rule. As previously noted, however, a rule may instead refer the rule validator 213 to an appropriate error message stored in a separate location.

Figure 3B:
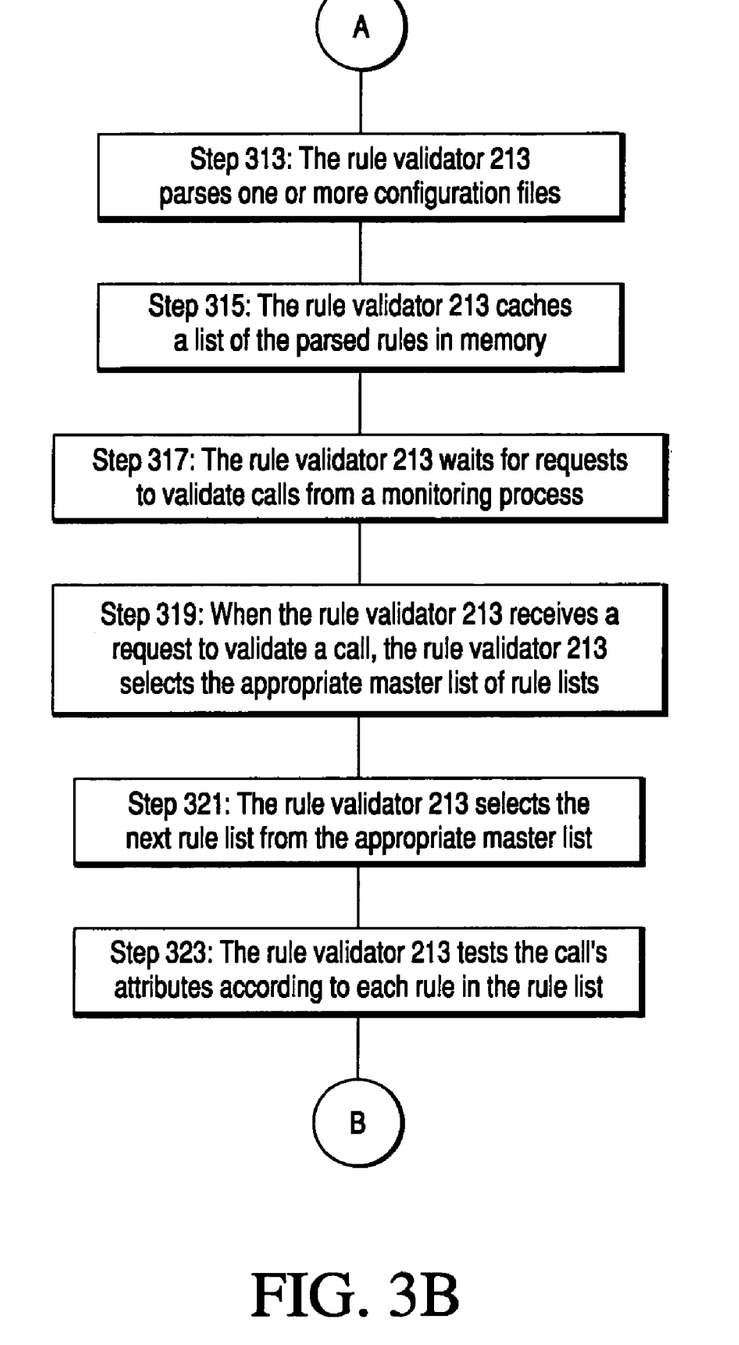
Figure 3C:
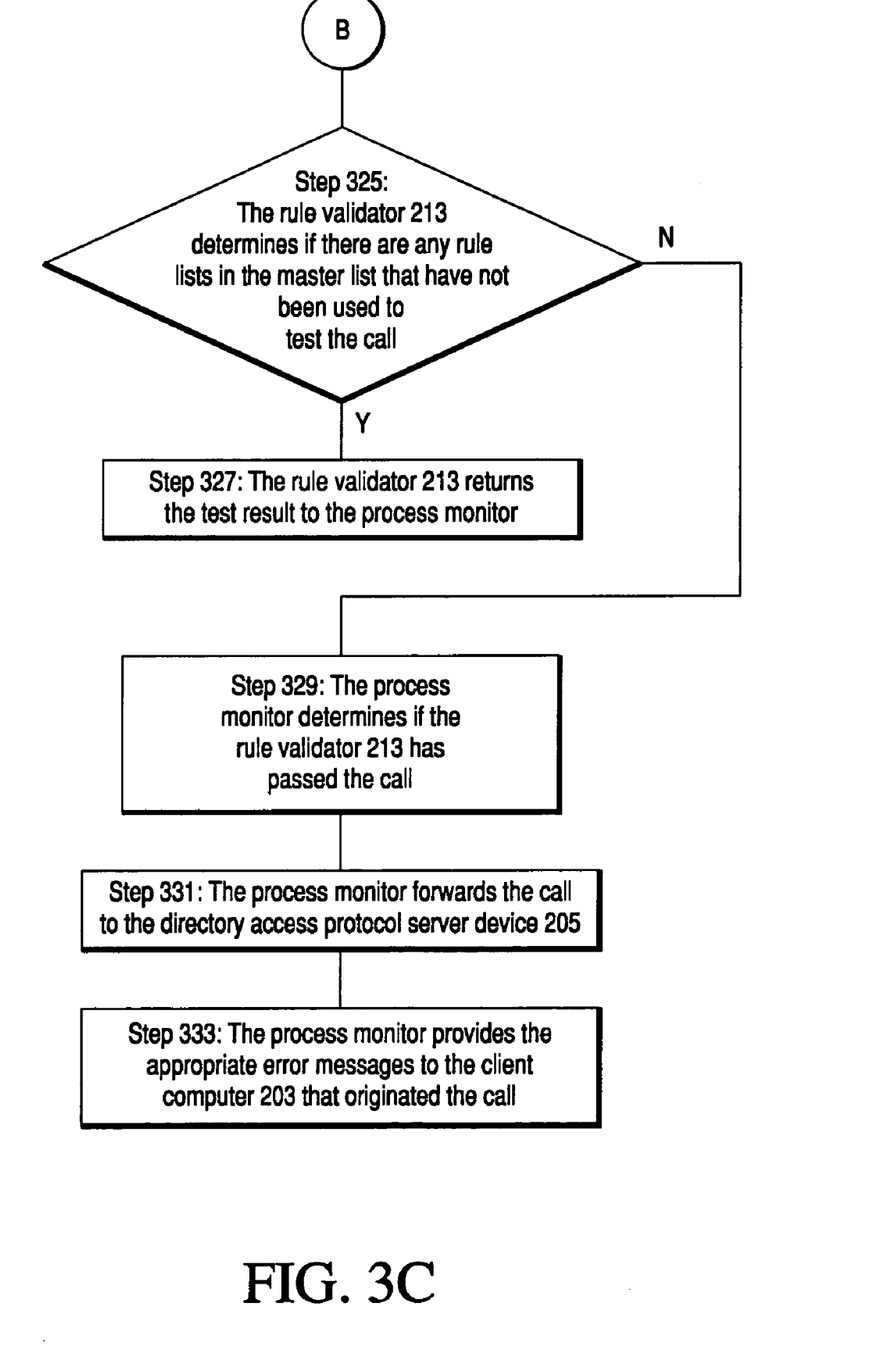

Returning now to FIG. 3, after the rule validator 213 has parsed the rules indicated in the configuration file, in step 315 the rule validator 213 caches a list of these rules in memory. More particularly, the rule validator 213 reads the first rule (e.g., the rule with the "precedence" value of "0") into a list. The rule validator 213 also reads any co-dependent rules specified by the first rule into the list. If a rule has no dependencies, its list will contain only the single rule. The rule validator 213 then creates a new list for the next rule, and this process is repeated until each rule (and its co-dependent rules) in the associated configuration file (or files) has been stored in a cached rule list. The rule validator 213 then prepares a master list of these rule lists in numerical order, according to the highest precedence rule in each list.

With some embodiments of the invention, the rule validator 213 may parse the configuration file or files and create the cached rule lists when the operation of the rule validator 213 is started. Alternately, with some embodiments of the invention, the rule validator 213 may postpone parsing the configuration file or files and/or creating the cached rule lists until a monitoring process passes a call to the rule validator 213 for validation.

Next, in step 317, the rule validator 213 waits for requests to validate calls from a monitoring process created by the transaction monitor 211. In the embodiments operating in a UNIX-based operating environment, for example, the rule validator 213 waits for a request via a UDP socket. As previously noted, for each incoming request from the transaction monitor 211 to validate a call, the call is guaranteed by the monitoring process referring the call to be a valid request seeking to add, modify, or delete directory information.

When the rule validator 213 receives a request to validate a call from the monitoring process, the rule validator 213 first selects the appropriate master list of rule lists for the call in step 319. As previously noted, the rule validator 213 may have one set of rules for validating calls to add information to the directory 209, another set of rules to validate calls deleting information from the directory 209, and still another set of rules to validate calls modifying information in the director 209, with each set of rules being obtained from a different configuration file. Accordingly, the rule lists for each set of rules may be collected into a separate master list. Thus, with these embodiments, the rule validator 213 first selects the master list containing the rule lists appropriate to the type of call that the rule validator 213 has been asked to validate.

Next, in step 321, the rule validator 213 selects the next rule list from the appropriate master list. For example, if the rule validator 213 is beginning the validation process, it will select the first rule in the master rule list. In step 323, the rule validator 213 tests the call's attributes according to each rule in the rule list in succession, until a positive result is found (i.e., until the attributes of the call pass one of the rules included in the rule list). If testing according to any of the rules in the rule list returns a positive result, then the rule validator 213 passes the call. Otherwise, the rule validator 213 fails the call. Then, in step 325, the rule validator 213 determines if there are any rule lists in the master list that have not been used to test the call. If there are additional rule lists in the master list that have not been used to test the call, then the rule validator 213 repeats steps 323 to 327. If, however, the rule validator 213 has tested the call against all of the rule lists in the appropriate master list, the rule validator 213 returns a test result to the process monitor in step 327. Specifically, if the rule validator 213 has failed the call according to any of the rule lists, the rule validator 213 provides the monitoring process with the error messages specified in those rule lists. If, however, the rule validator 213 has passed the call, the rule validator 213 provides the monitoring process with a message indicating that the call has passed.

With some embodiments of the invention, the rule validator 213 may process each request to validate a call on a first in, first out (FIFO). Also, with some embodiments of the invention, more than one rule validator 213 may be employed to validate calls.

With these embodiments, if a rule validator 213 is started and detects that the port to which it is to bind is already in use, the rule validator 213 will drop into a backup mode. At user-defined intervals, the rule validator 213 will verify that the master rule validator 213 (i.e., the rule validator 213 previously using the port) is still active and will assume the master role if the port becomes available.

As will be appreciated by those of ordinary skill in the art, a rule validator 213 can verify of a master rule validator 213 is still active in multiple ways. For example, the backup rule validator 213 may periodically (according to a preset period) activate and verify that the port the backup rule validator 213 is configured to serve is still in use. This insures that the master rule validator 213 is still bound to the port and serving incoming requests. If the port is not in use, it is not bound and the backup rule validator 213 immediately becomes active for the port. Alternately, the master rule validator 213 may periodically sends out a beacon signal (according to a preset period). If three consecutive expected replies to the beacon signals are not received from the backup rule validators 213, it is assumed that, whether or not the port for the master rule validator 213 is bound, the master validator 213 has stopped functioning, and a kill signal is issued to it to free up the bound port. The port can then be bound by a backup rule validator 213, which immediately becomes active. Of course, those of ordinary skill in the art will appreciate still other techniques for monitoring the status of the master rule validator 213. Thus, several rule validators 213 can be running at any time, but only one will be active for a specific port.

In step 329, the process monitor determines if the rule validator 213 has passed the call. If the call has been passed, then the call is successfully validated, and the process monitor forwards the call along to the directory access server 205 in step 331, and monitoring continues until the session is closed. If, however, the process monitor determines that the rule validator 213 failed the call, then the process monitor provides the appropriate error messages (forwarded by the rule validator 213) to the client computer 203 that originated the call in step 333, and the session is closed. Of course, those of ordinary skill in the art will appreciate that, with various embodiments of the invention, the rule validator 213 may forward passing calls directly to the directory access server 205. Similarly, with alternate embodiments of the invention, the rule validator 213 may return error messages for failed calls directly to the client computer 203 that submitted the call.

As will be understood from the foregoing description, the directory attribute rule enforcer according to the invention provides a method and system for enforcing content rules regarding a directory, such as a LDAP directory. It should be noted, however, that the method and apparatus according to the invention, as described above, does not modify or delete data submitted to the directory. Instead, it simply rejects the call if the data in the call does not comply with rules previously determined by the directory provider. Moreover, as described above, the directory attribute rule enforcer according to the invention may advantageously provide the source of a rejected call with an error message explaining, e.g., why the call to the directory was rejected, and what may be done to correct the call.

While the description of particular embodiments of the invention made above discuss only a single transaction monitor 211 and a single directory access server 205, those of ordinary skill in the art will appreciate that various embodiments of the invention may employ multiple transaction monitors 211 and multiple directory access server 205, in addition (or as an alternative) to employing multiple rule validators 213. Moreover, each transaction monitor 211, rule validator 213, and directory access server 205 may be implemented on a single computer system or shared between multiple computer systems. Further, a single computer system may host multiple components of the invention, such as a transaction monitor 211 and a rule validator 213, or an attribute rule enforcer 201 and a directory access server 205.

The present invention has been described above by way of specific exemplary embodiments, and the many features and advantages of the present invention are apparent from the written description. Thus, it is intended that the appended claims cover all such features and advantages of the invention. Further, since numerous modifications and changes will readily occur to those skilled in the art, the specification is not intended to limit the invention to the exact construction and operation ad illustrated and described. For example, the invention may include any one or more elements from the apparatus and methods described herein in any combination or subcombination. Accordingly, there are a number of alternative combinations for defining the invention, which incorporate one or more elements from the specification (including the drawings, claims, and summary of the invention) in any combinations or subcombinations. Hence, all suitable modifications and equivalents may be considered as falling within the scope of the appended claims.

What is claimed is:

1. A method for processing calls to a directory access server, comprising:
   intercepting a call from a client computer to a directory access server, the call consisting of one of a request to add data to a directory associated with the directory access server, a request to modify data in the directory, and a request to delete data from the directory, the call further including at least one attribute associated with data having a data content and a data structure;
   evaluating the attribute according to a first rule governing data content that is permissible to be forwarded to the directory access server and a second rule governing data structure that is permissible to be forwarded to the directory access server;
   the first and second rules including a data addition rule when the call includes a request to add data to the directory;
   the first and second rules including a data modification rule when the call includes a request to modify data in the directory;
   the first and second rules including a data deletion rule when the call includes a request to delete data from the directory;
   determining whether the attribute complies with the first rule and the second rule;
   forwarding the call to the directory access server if the attribute complies with the first rule and the second rule; and
   rejecting the call to the directory access server and forwarding an error message to a source of the call if the call attribute does not comply with the first rule and the second rule,
   said steps of evaluating the attribute and determining whether the attribute complies with the first rule and second rule being performed by an attribute rule enforcer interposed between the directory access server and the client computer.

2. An attribute rule enforcer, comprising:
   a rule validator and a transaction monitor, the rule validator and transaction monitor being interposed between a client computer and a directory access server;
   the transaction monitor being capable of intercepting a call from a client computer to a directory access server, diverting the intercepted call to the rule validator if the call includes one of a request to add data to a directory associated with the directory access server, a request to modify data in the directory, and a request to delete data from the directory, and being further capable of forwarding the intercepted call to the directory access server if the call does not include one of a request to add data to the directory, a request to modify data in the directory, and a request to delete data from the directory; and the rule validator being capable of determining whether an attribute of a call complies with a first rule governing content of data that is permissible to be forwarded to the directory access server and a second rule governing structure of data that is permissible to be forwarded to the directory access server, the first and second rules including a data addition rule when the call includes a request to add data to the directory, the first and second rules including a data modification rule when the call includes a request to modify data in a directory, and the first and second rules including a data deletion rule when the call includes a request to delete data from the directory;

the rule validator further being capable of forwarding the call to the directory access server if the attribute complies with one of the first rule and the second rule and being further capable of rejecting the call to the directory access server and returning an error message to a source of the call if the attribute does not comply with the first rule and the second rule.

3. The attribute rule enforcer recited in claim 2, wherein the rule validator is capable of forwarding the call to the transaction monitor, and the transaction monitor is capable of relaying the call to a directory.

4. The attribute rule enforcer recited in claim 2, wherein the rule validator is capable of forwarding the call to the directory access server.

5. A directory network including:
   one or more client computers;
   a directory access server, said directory access server being capable of controlling access to a directory associated with the directory access server, and
   an attribute rule enforcer, said attribute rule enforcer comprising:
   a rule validator and a transaction monitor, the rule validator and transaction monitor being interposed between a client computer and a directory access server;

the transaction monitor being capable of intercepting a call from a client computer to a directory access server, diverting the intercepted call to the rule validator if the call includes one of a request to add data to a directory associated with the directory access server, a request to modify data in the directory, and a request to delete data from the directory, and being further capable of forwarding the intercepted call to the directory access server if the call does not include one of a request to add data to the directory, a request to modify data in the directory, and a request to delete data from the directory; and the rule validator being capable of determining whether an attribute of the call complies with a first rule governing content of data that is permissible to be forwarded to the directory access server and a second rule governing structure of data that is permissible to be forwarded to the directory access server, the first and second rules including a data addition rule when the call includes a request to add data to the directory, the first and second rules including a data modification rule when the call includes a request to modify data in the directory, and the first and second rules including a data deletion rule when the call includes a request to delete data from the directory;

the rule validator being further capable of forwarding the call to the directory access server if the attribute complies with one of the first rule and the second rule and being further capable of rejecting the call to the directory access server and returning an error message to a source of the call if the attribute does not comply with the first and the second rule;

the attribute rule enforcer being arranged in the directory network so as to intercept calls from the one or more client computers to the directory access server, said attribute rule enforcer being interposed between the one or more client computers and the directory access server.

* * * * *

UNITED STATES PATENT AND TRADEMARK OFFICE
CERTIFICATE OF CORRECTION

| | | |
|---|---|---|
| PATENT NO. | : 7,328,210 B2 | Page 1 of 1 |
| APPLICATION NO. | : 09/921015 | |
| DATED | : February 5, 2008 | |
| INVENTOR(S) | : Ronald S. Barchi and Jeffrey P. Carter | |

It is certified that error appears in the above-identified patent and that said Letters Patent is hereby corrected as shown below:

Col. 19, line 17, please replace "data in a directory" with --data in the directory--

Signed and Sealed this

Thirty-first Day of March, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,328,210 B2                                    Page 1 of 1
APPLICATION NO. : 09/921015
DATED              : February 5, 2008
INVENTOR(S)        : Ronald S. Barchi and Jeffrey P. Carter

It is certified that error appears in the above-identified patent and that said Letters Patent is hereby corrected as shown below:

Title Page, under Item (56) U.S. PATENT DOCUMENTS, please add the following:

6,609,121 B1   08/2003   Ambrosini et al.   707/3
6,535,879 B1   03/2003   Behera             707/9
6,587,856 B1   07/2003   Srinivasan et al.  707/102
6,539,077 B1   03/2003   Ranalli et al.     379/67.1

Signed and Sealed this

Twelfth Day of May, 2009

JOHN DOLL
*Acting Director of the United States Patent and Trademark Office*